(12) United States Patent
Ohno et al.

(10) Patent No.: US 8,996,220 B2
(45) Date of Patent: Mar. 31, 2015

(54) TORQUE CONTROL DEVICE

(75) Inventors: Sho Ohno, Isehara (JP); Yuji Katsumata, Atsugi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/236,093

(22) PCT Filed: Jun. 20, 2012

(86) PCT No.: PCT/JP2012/065709
§ 371 (c)(1),
(2), (4) Date: Jan. 30, 2014

(87) PCT Pub. No.: WO2013/021731
PCT Pub. Date: Feb. 14, 2013

(65) Prior Publication Data
US 2014/0188319 A1 Jul. 3, 2014

(30) Foreign Application Priority Data

Aug. 5, 2011 (JP) .................................. 2011-171554

(51) Int. Cl.
*B60W 20/00* (2006.01)
*B60W 10/08* (2006.01)
(Continued)

(52) U.S. Cl.
CPC ............. *B60W 20/10* (2013.01); *B60W 10/08* (2013.01); *B60W 20/00* (2013.01); *B60W 20/106* (2013.01); *B60W 10/26* (2013.01); B60W 2050/0054 (2013.01); B60W 2510/0638 (2013.01);
(Continued)

(58) Field of Classification Search
CPC ..... B60W 20/10; B60W 30/20; B60W 10/26; B60W 20/00; B60W 10/08; B60W 2030/206; B60W 2710/083; B60W 2710/081; B60W 2510/0638; B60W 2710/0666; B60W 2050/0054; B60W 2510/081; B60W 2710/086; B60W 20/106; B60L 15/20; B60L 2240/421; B60L 2240/423; B60L 2270/147; Y10S 903/902; Y02T 10/642
USPC ............. 701/22; 180/65.21, 65.285; 903/902, 903/906
See application file for complete search history.

(56) References Cited

FOREIGN PATENT DOCUMENTS

| JP | 10-178705 A | 6/1998 |
|---|---|---|
| JP | 11-6449 A | 1/1999 |

(Continued)

OTHER PUBLICATIONS

International Search Report for corresponding International Application No. PCT/JP2012/065709, mailed Sep. 4, 2012 (4 pages).

*Primary Examiner* — James Trammell
*Assistant Examiner* — Brian P Sweeney
(74) *Attorney, Agent, or Firm* — Osha Liang LLP

(57) ABSTRACT

A torque control device for use in a hybrid vehicle equipped with a generator driven by an internal combustion engine has a command value calculator that calculates an engine torque command value and a rotation speed command value of the generator based on a target generation power of the generator set in accordance with a running state of the hybrid vehicle, a generator torque command value calculator that calculates a generator torque command value to cause a rotation speed calculation value to match the rotation speed command value, a generator controller that controls the generator based on the generator torque command value, a rotation speed detector that detects a rotation speed detection value of the generator, and a pulsation removal filter.

4 Claims, 7 Drawing Sheets

1 engine
2 generator
4 generator inverter
5 battery
6 drive inverter
7 driving motor
8 reduction gear
10 power generation control unit 21 engine controller
22 generator controller
23 battery controller
24 driving motor controller

(51) Int. Cl.
  *B60W 10/26* (2006.01)
  *B60L 15/20* (2006.01)
  *B60W 30/20* (2006.01)
  *B60W 50/00* (2006.01)

(52) U.S. Cl.
  CPC .. *B60W2510/081* (2013.01); *B60W 2710/0666* (2013.01); *B60W 2710/081* (2013.01); *B60W 2710/083* (2013.01); *B60W 2710/086* (2013.01); *B60L 15/20* (2013.01); *B60L 2240/421* (2013.01); *B60L 2240/423* (2013.01); *B60L 2270/147* (2013.01); *Y02T 10/642* (2013.01); *B60W 30/20* (2013.01); *B60W 2030/206* (2013.01); *Y10S 903/902* (2013.01); *Y10S 903/906* (2013.01)
  USPC .................. 701/22; 180/65.21; 180/65.285; 903/902; 903/906; 903/902

(56) References Cited

FOREIGN PATENT DOCUMENTS

| JP | 2005-151797 A |   | 6/2005 |   |
|----|---------------|---|--------|---|
| JP | 2013-009513 A | * | 1/2013 | ............... B60K 6/46 |

* cited by examiner 1  engine
2  generator
4  generator inverter
5  battery
6  drive inverter
7  driving motor
8  reduction gear
10 power generation control unit 21 engine controller
22 generator controller
23 battery controller
24 driving motor controller 1 engine
2 generator
11 operation point calculation
12 rotation speed control unit
21 engine controller
22 generator controller
131 control object model Gp
133 band pass filter $G_{BPF}$ 1 engine
2 generator
11 operation point calculation
12 rotation speed control unit
21 engine controller
22 generator controller
131 control object model $G_p$
133 band pass filter $G_{BPF}$ 1 engine
2 generator
11 operation point calculation
12 rotation speed control unit
21 engine controller
22 generator controller
131 control object model Gp
133 band pass filter 133 $G_{BPF}$ 1 engine
2 generator
11 operation point calculation
12 rotation speed control unit
21 engine controller
22 generator controller
131 control object model $G_p$
133 band pass filter $G_{BPF}$
136 high pass filter $G_{HPF}$
137 high pass filter $G_{HPF}$

TORQUE CONTROL DEVICE

CROSS-REFERENCE TO RELATED APPLICATIONS

The present application claims priority to Japanese Patent Application No. 2011-171554 filed on Aug. 5, 2011, which is incorporated herein by reference in its entirety.

BACKGROUND

1. Technical Field

The present invention relates to a torque control device.

2. Related Art

An electric vehicle is known, which is provided with an internal combustion engine, an electric generator coupled to the internal combustion engine and rotatably driven by the internal combustion engine in accordance with the field control by field current to generate power corresponding to the driven rotating speed, a storing device for storing the electric power generated by the generator, a driving motor rotatably driven based on the power supplied from the storing device, and a power generation control unit (see Patent Document 1). There, the power generation control unit is configured such that the engine is rotatably driven based on the optimum torque characteristic, a required power to be generated is calculated based on the running state from time to time, and a target rotating speed is calculated by which the generator is controlled as a control target based on that power and the optimum torque characteristic of the internal combustion engine. Specifically, based on target rotating speed of the generator corresponding to the required power or energy, the generator is field-controlled, and the generator 3 is rotatably driven at a rotating speed which balances the driving torque of the generator 3 relative to the generated torque by the rotation of the internal combustion engine.

Patent Document 1: JP 10-178705

SUMMARY

Conventionally, electric power generated by the generator may vary or fluctuate due to the torque pulsation of the engine.

A torque control device according to one or more embodiments of the present invention suppresses the pulsation or fluctuation of the power generated by the generator.

According to one or more embodiments of the present invention, a pulsation suppression or removal filter removes a rotation speed pulsation value from a rotation speed detection value detected by the rotation detection unit due to pulsation of the engine and calculates a rotation speed calculation value.

According to one or more embodiments of the present invention, since the torque of the generator is controlled so as to match the rotation speed obtained by removing the pulsation or ripple component due to the torque pulsation of the engine and the rotation speed command value, the torque pulsation of the generator may be suppressed so that the power fluctuation of the generator is suppressed.

DETAILED DESCRIPTION

Embodiments of the present invention is described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
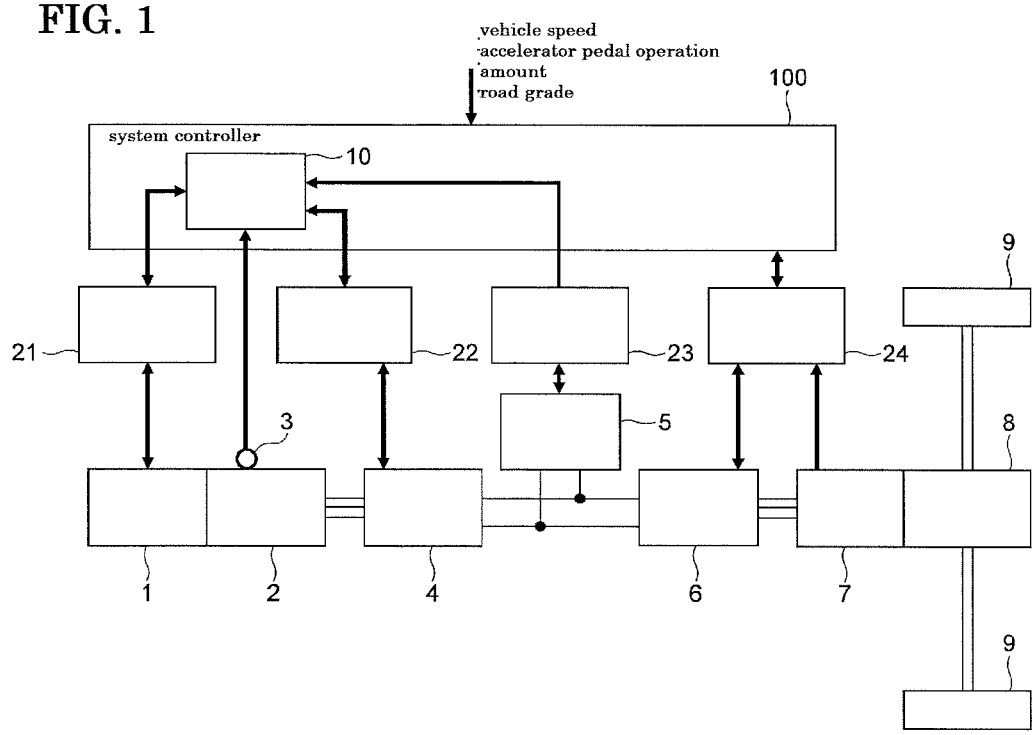
FIG. 1 is a block diagram of a vehicle including a torque control device according to one or more embodiments of the present invention.

FIG. 1 is a block diagram showing an outline of a vehicle including a torque control device according to a first embodiment of the present invention. An example will be described below in which the present torque control device is applied to a hybrid vehicle of a series type. However, the torque control device of the first embodiment may be equally applicable to a parallel type, hybrid vehicle in which both the engine and the motor are used as power source.

As shown in FIG. 1, the vehicle including a torque control device of the first embodiment includes an engine 1, a generator 2, a rotation angle sensor 3, a generator inverter 4, a battery 5, a drive inverter 6, a drive motor 7, a reduction gear 8, a drive wheel 9, the engine controller 21, a generator controller 22, a battery controller 23, a drive motor controller 24, and a system controller 100.

The engine 1 produces energy to deliver to an output shaft by burning gasoline, diesel or other fuel and is driven by controlling a throttle valve opening of a throttle valve or a fuel injection amount of a fuel injection valve, and the like based on a control signal from an engine controller. An electric generator 2 is coupled to the output shaft of the engine 1 to be driven by the engine 1. Further, the generator 2 consumes power either by cranking the engine 1 at the start up of the engine 1 or by drivingly rotating the engine 1 through the use of the driving force of the generator 2. The rotation angle sensor 3 is configured with a resolver for detecting the rotation angle of the rotor of the generator 2 to serve a sensor for detecting the rotation speed of the generator 2. The detection value is output to the system controller 100.

The generator invertor 4 is provided with a plurality of switching elements such as IGBT and configured to be a conversion circuit for converting AC power output from the generator 2 to DC power or for inverse conversion to AC power from a DC power by switching the switching element on and off responsive to a switching signal from the generator controller 22.

The generator inverter 4 is connected to the battery 5 and the drive inverter 6. Further, the generator inverter 4 is provided with a current sensor (not shown), the detection values of the current sensor and the like is output to the generator controller 22. The battery 5 is a secondary battery connected between the generator inverter 4 and the drive inverter 6 to supply power to the drive inverter 6, or to be charged with electric power from the generator inverter 4. The drive inverter 6 is a conversion circuit that converts DC power that is output from the battery 5 or the generator inverter 4 to AC power and outputs the AC power to the driving motor 7. The drive inverter 6 is controlled based on the control signal of the driving motor controller 24. Further, the drive inverter 6 is provided with a current sensor (not shown) and the detection value of the current sensor and the like is outputted to the drive motor controller 24.

The driving motor 7 represents a drive source that is driven by an AC power from the drive inverter 6, to drive the vehicle. Further, the driving motor 7 is connected to a rotation angle sensor (not shown), and the detection value of the rotation angle sensor is outputted to the drive motor controller 24. The output shaft of the driving motor 7 is connected to the left and right drive wheels 9 of the left and right via the reduction gear 8 and the left and right drive shafts. In addition, the driving motor 7 re-generates energy by generating a regenerative driving force due to the rotation of the driving wheels 9.

The engine controller 21 is a controller for controlling the engine 1 by setting a valve opening of the throttle valve, a fuel injection amount of the fuel injection valve, an ignition timing and the like based on an engine torque command value (TeCMD) transmitted from the system controller 100, detection values of an air-fuel ratio sensor (not shown), oxygen sensor (not shown), a temperature sensor, and the like. The generator controller 22 controls the generator invertor 4 by setting a switching signal of a switching element included in the generator invertor 4 based on a generator torque command value (TmCMD) and a detection value of a current sensor (not shown) included in the current sensor.

The battery controller 23 manages the amount of power that can be output of and the charging amount of power to the battery 5 by measuring the state of charge of the battery 5 (SOC; State of Charge) based on the detection value of current of the battery detected by a current sensor and the like. The driving motor controller 24 controls the drive invertor based on a control signal from the system controller 100, a detection value of a current sensor (not shown) included in the driving motor 7, a rotation speed, and the like.

The system controller 100 has a power generation control unit 10 and controls the entire vehicle so as to control the engine controller 21, the generator controller 22, the battery controller 23 and the driving motor controller 24. The system controller 100 manages the state of the engine via the engine controller 21, manages the control state of the generator invertor 4 via the generator controller 22, manages the state of the battery 5 via the battery controller 23, and manages both the drive invertor 6 and the driving motor 7 via the driving motor controller 24, respectively.

The system controller 100 detects a vehicle speed detected by a vehicle speed sensor (not shown), an accelerator pedal operation amount detected by an accelerator opening sensor (not shown), and the running state of the vehicle from the slope or grade detected by a tilt sensor. Thus, the system controller sets a target value of generating power generated by the generator 2 to supply power to the driving motor 7 corresponding to the power available for input/output of the battery controlled by the battery controller 23 as well as the generation power of the generator 2. The power generation control unit 10 calculates both an engine torque command value (TeCMD) and a generation torque command value (TmCMD).

Figure 2:
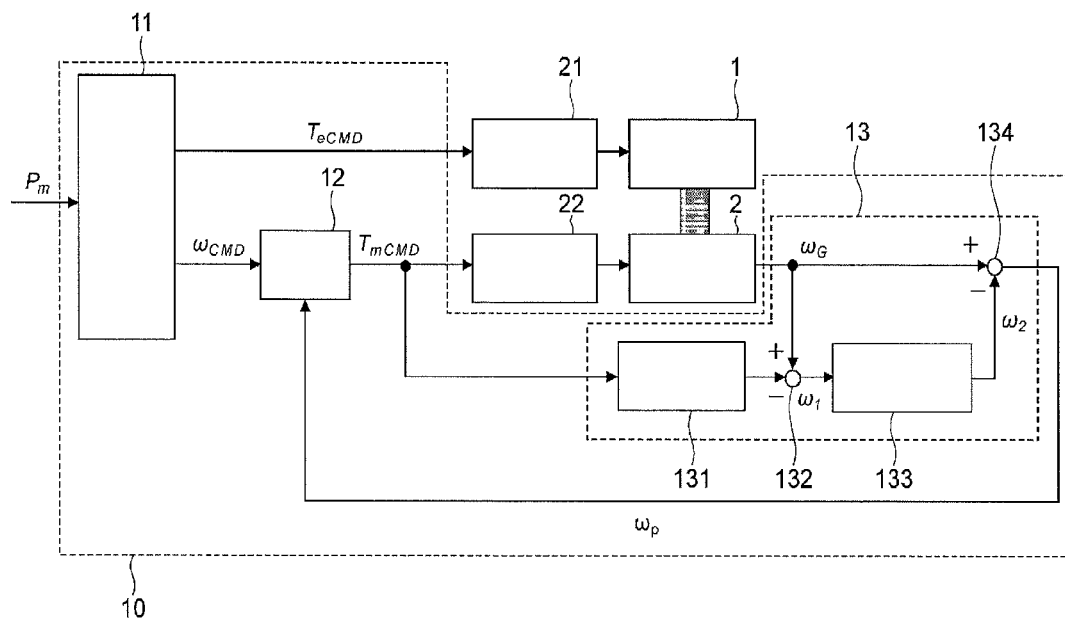
FIG. 2 is a block diagram showing the engine, the generator, the engine controller, the generator controller, and the power generation control unit in FIG. 1.

Now, with reference to FIG. 2, the configuration of the generation control unit 10 will be described. FIG. 2 shows a block diagram of the engine 1, the generator 2, the engine controller 21, the power generation control unit 10 and the generator controller 22. Further, the power generation control unit 10 includes an operating point calculation unit 11, a rotation speed control unit 12, and a pulsation removal filter 13.

The operating point calculation unit 11 sets both the engine torque command value and (TeCMD) and the rotation speed command value ($\omega$CMD) of the generator 2 in order for the engine 1 to operate at the optimum torque to generate a target generated power (Pm) by the generator 2, and outputs these to the engine controller 21 and the rotation speed control unit 12, respectively. The operating point calculation unit 11 has installed therein a map in advance showing an optimum torque characteristic of the engine 1 against the target generation power (Pm). Thus, the operating point calculation unit 11 calculates the engine torque command value (TeCMD) and the rotation speed command value ($\omega$CMD) of the generator 2 by referring to the map using the target generation power (Pm) as input.

The rotation speed control unit 12 receives the rotation speed command value ($\omega$CMD) and a rotation speed calculation value ($\omega$p) described below, and outputs a generator torque command value (TmCMD) to the controller 12 and engine controller 21. The rotation speed control unit 12 is composed of a PID compensator, and, by using the following equation (1), the generator torque command value to (TmCMD) will be output.

[Equation 1]

$$T_{mCMD} = \left(K_P + \frac{K_I}{s} + \frac{K_D \cdot s}{T_D + 1}\right) \cdot (\omega_{CMD} - \omega_P) \quad (1)$$

Wherein, KP is the proportional gain, KI is the integral gain, KD is the derivative gain, TD is time constant of approximate differentiation, and "s" is the Laplace operator.

As described below, since the rotation speed calculation value ($\omega$p) is a value that is caused to pass through a pulsation removal filter 13 and is subjected to a feedback control, the rotation speed control unit 12 calculates the generator torque command value (TmCMD) so as to match the rotation speed calculation value ($\omega$p) and the rotation speed command value ($\omega$CMD) by using the equation (1).

The pulsation removal filter 13 includes a control object model and (Gp) 131, subtractors 132, 134, and a band pass filter 133. The control object model 131 is represented by a transfer function modeling (linearizing) the control object in the first embodiment and may be expressed by the following equation (2).

[Equation 2]

$$G_p(s) = \frac{1}{Js + D} \quad (2)$$

Wherein, J is a moment of inertia about an axis of the output shaft, D is a viscous friction coefficient of the lubricating oil.

The control object model 131 estimates an estimated value (Gp·TmCMD) by using the equation (2) and the generator torque command value (TmCMD) as an input.

The subtractor 132 subtracts from the rotation speed detection value ($\omega G$) corresponding to a detection value of the rotation angle sensor 3 an estimated value of the control object model 131, and outputs a rotation speed ($\omega 1$) to a band path filter 133. Stated in another way, the rotation speed ($\omega 1$) is calculated by the following formula (3):

[Equation 3]

$$\omega_1 = \omega_G - G_p \cdot T_{mCMD} \quad (3)$$

The band path filter is the one for filtering the pulsating component included in the rotation speed of the generator 2 due to the torque pulsation of the engine 1, and is constituted by a filter that allows at least the intermittent burning frequency of the engine to pass so as to represent a feedback element to remove the rotation speed pulsation value ($\omega s$). The transfer characteristic of the band-pass filter 133 (GBPF) is represented by the following equation (4).

[Equation 4]

$$G_{BPF}(s) = \frac{2\zeta\omega_n s}{s^2 + 2\zeta\omega_n s + \omega_n^2} \quad (4)$$

Where, $\zeta$ is the damping coefficient, $\omega n$ is a natural frequency and corresponds to the center frequency of the pass frequency of the band pass filter 133. The natural frequency ($\omega n$) is the frequency to be adjusted to match the intermittent firing frequency of the engine 1. The intermittent combustion frequency of the engine 1 is the frequency that is set by the combustion cycle of a multi-cylinder engine 1.

The rotation speed ($\omega 1$) which is the output value of 0028 the subtractor 132 passes through a band pass filter 133, and the rotation speed ($\omega 2$) is output from the band pass filter 133. The rotation speed ($\omega 2$) may be represented by equation (5).

[Equation 5]

$$\omega_2 = G_{BPF} \omega_1 \quad (5)$$

The rotation speed ($\omega 2$) corresponds to the amount of pulsation of the rotation speed detection value ($\omega G$) and is equivalent to rotation speed pulsation value ($\omega s$).

The subtractor 134 calculates the rotation speed calculation value ($\omega p$) by subtracting the rotation speed ($\omega 2$) from the rotation speed detection value ($\omega G$). Then, the rotation speed calculation value ($\omega p$) is feedbacked to the rotation speed control unit 12. Thus, the pulsating component contained in the rotation speed detection value ($\omega G$) is eliminated, and the rotation speed control unit 12 calculates the torque command value (TmCMD) to match the detection value free from the pulsation components and the rotation speed command value ($\omega$CMD).

Now, description is given of the characteristics of the generated power, the rotation speed characteristics and the torque characteristics in the torque control device pertaining to the first embodiment with reference to FIG. 3. As a prerequisite for the simulation, the operation is started from the time at which the engine 1 is stopped while the generator 2 is rotating at a constant speed, and upon elapse of one second, the pulsating engine torque is applied. Note that in FIG. 3, the graph a indicates the characteristics of the engine torque control in the first embodiment while the graph b indicates a comparative example without carrying out the feedback control using the pulsation removal filter. Further, the graph c represents the characteristics of the rotation calculation value ($\omega p$). FIG. 3(a) shows the time characteristics of the electric power generated by the generator 2, and FIG. 3(b) shows the time characteristics of the rotation speed of the generator 2 (or the rotation speed of the engine 1), FIG. 3(c) shows the time characteristics of the torque of the generator 2, and FIG. 3(d) shows the time characteristics of the torque of the engine 1, respectively.

Figure 3A:
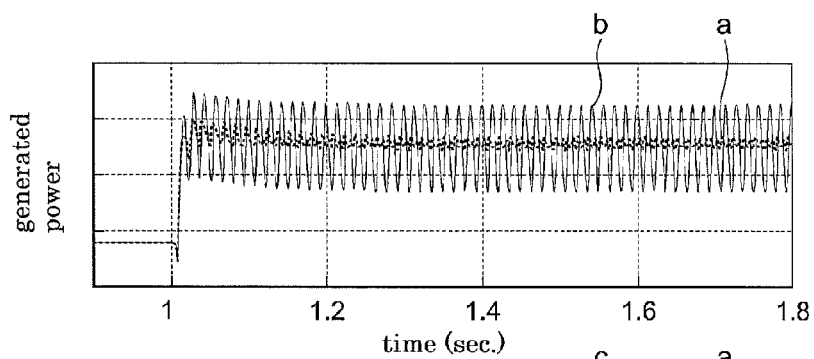
FIG. 3(*a*) is a graph showing the characteristics of the generated power of the generator 2 shown in FIG. 1, (b) is a graph showing the characteristics of the rotation speed of the generator 2 of FIG. 1, (c) is a graph showing the torque characteristics of the generator 2 of FIG. 1, and (d) is a graph showing torque characteristics of the engine 1 in FIG. 1, respectively.
Figure 3B:
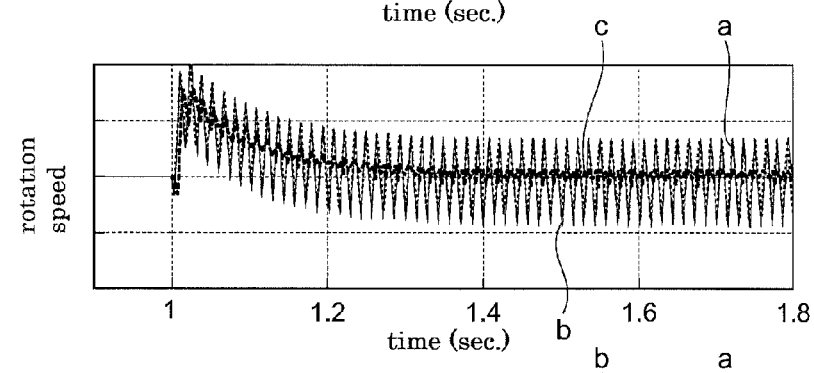
Figure 3C:
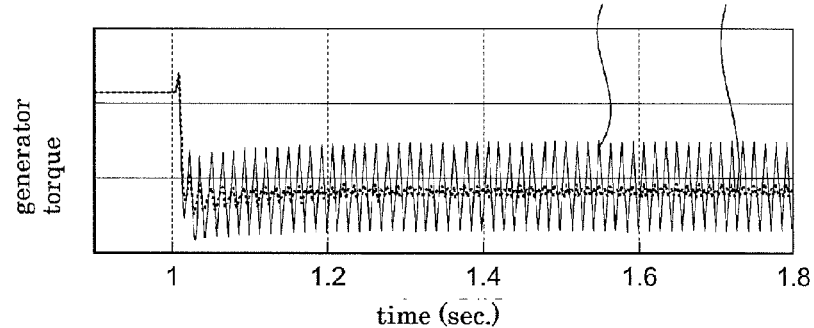
Figure 3D:
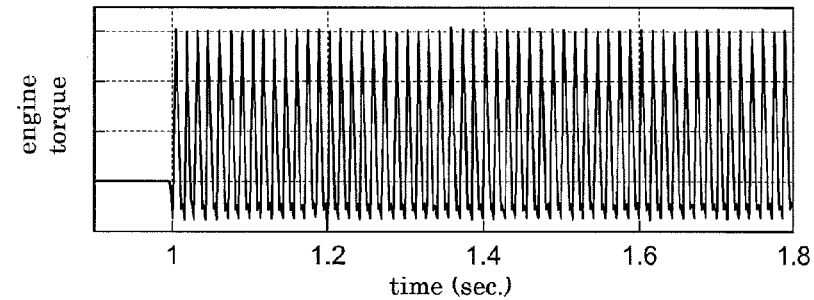

At a one second time elapse, when the engine torque pulsation shown in FIG. 3(d) is applied, as shown in FIGS. 3(b) and 3(d), since both the generator torque and the rotation speed contain pulsating components, as shown in FIG. 3(a), the generated power greatly fluctuates. On the other hand, in the first embodiment, as shown in FIGS. 3(b) and 3(c), the pulsations in both the generator torque and the rotation speed are suppressed so that the fluctuations in the generated power is also suppressed as shown in FIG. 3(a). Further, as shown in FIG. 3(b), since the overshoot amount in the first embodiment is equivalent to the comparative example, the variations of generated power may be suppressed without sacrificing the disturbance resistance according to the first embodiment.

As described above, the first embodiment includes a rotation speed control unit 1 that calculates the generator torque command value (TmCMD) so as to match the rotation speed calculation value ($\omega p$) and the rotation speed command value ($\omega$CMD), and a pulsation removal filter 13 that calculates the rotation calculation value ($\omega p$) by removing the rotation speed pulsation due to the engine pulsation from the rotation speed detection value. Thus, torque is controlled based on the value that eliminates the rotation speed pulsation due to the engine torque pulsation so that the torque pulsation of the generator 2 may be suppressed so that the variations in generated power may be suppressed.

Incidentally, in the case of controlling the torque of the generator 2 without using the pulsation removal filter 13, unlike the first embodiment, to match the rotation speed command value and the rotation speed calculation value, in an operating region of high engine speed, since the frequency of the pulsation rotation speed is high due to the engine torque pulsation with a detection delay, the pulsation of the rotation speed may not be suppressed to cause the generator torque to pulsate so that the variations in the generated power fluctuates greatly. In the operating region such as this, it is also conceivable that, by reducing the gain at the rotation speed control to thereby decrease fluctuations in the rotation speed, the pulsations in the generated power may be suppressed. However, at a decreased gain, the anti-disturbance property may deteriorate.

Further, in the operation region of low engine speed, when the engine torque pulsation is greater than the maximum torque available with the generator 2, it is impossible to suppress the engine torque pulsation. The generator 2 is driven by the torque of the engine 1 during power generation, and while maintaining the target rotational speed, the generator 2 generates a continuous regenerative torque as balanced with the engine torque. Therefore, the maximum torque of the generator 2 is required to be designed as small as possible. Therefore, when designing the generator 2 so as to suppress the excessive engine torque pulsations by the generator 2, the size and cost of the generator 2 increase.

Further, a torque fluctuation control device for a hybrid engine is known in which a motor/generator is coupled to the output shaft of the engine and which suppresses torque pulsation that occurs at the output shaft by calculating a pulsation compensation torque of the motor/generator by a feedforward control. In this torque fluctuation control device, at a high engine speed, due to the response delay in the motor/generator, the output torque of the motor/generator may be incapable of following the torque pulsation of the engine so that the torque pulsation cannot be suppressed. Further, at a low engine speed, when the engine torque pulsation exceeds the maximum torque that can be generated by the motor/generator, the engine torque pulsation cannot be suppressed.

In the first embodiment, the pulsation removal filter 13 removes or eliminates the pulsation of the rotation speed due to the pulsation of the engine 1. The generator torque command value (TmCMD) is calculated by using the rotation speed calculation value ($\omega$p) without containing a pulsating component and using the rotation speed command value ($\omega$CMD) to control the torque of the generator 2. That is, in first embodiment, even when the frequency of the pulsation of the rotation speed due to the engine torque pulsation is high, because the pulsating component included in the pulsating rotation speed is eliminated, it is possible to suppress the torque pulsation of the generator 2. Further, since a gain is not decreased to be feedback controlled to suppress the torque pulsation, the anti-disturbance property is not deteriorated. Further, because of no need to design the generator 2 to suppress the engine torque pulsation by the generator 2, the size of the generator may be reduced and cost of the generator 2 may be decreased.

In the first embodiment, unlike the conventional technology, such a control in not executed in which the output torque of the generator 2 follows the output torque of the engine 1. Thus, even at a high engine speed and due to a response delay of the generator 2, even when the engine torque pulsates and the rotation speed also pulsates, when performing a feedback control, the pulsation of the rotation speed is removed by the pulsation removal filter 13 so that both the torque pulsation in the generator 2 as well as the variations in the generated power may be suppressed.

Further, in the first embodiment, a rotation speed pulsation value ($\omega$s) is calculated by the difference between the estimated value estimated by the control object model 131 and the rotation speed detection value ($\omega$G). The first embodiment is also provided with a band pass filter 133 whose pass frequency matches the intermittent combustion frequency of the engine 1 and a first subtractor 134 that calculates the rotation speed calculation value ($\omega$p) based on a difference between the rotation speed calculation value ($\omega$G) and the rotation speed pulsation value ($\omega$s). Thus, according to the first embodiment, the torque fluctuation in the generator 2 may be suppressed and the fluctuation in the generated power may be alleviated without causing the control stability and anti-disturbance property to be impaired.

That is, unlike the first embodiment, when a simple band elimination filter (notch filter) is used in order to remove the rotational speed pulsations from the rotation speed detected value, when the frequency band of the pulsating rotation speed and the control frequency bad are extremely close to each other, stability may be deteriorated significantly with the rotation speed detection delayed. On the other hand, in the first embodiment, because the rotation speed containing a pulsating component is calculated based on the rotation detection value ($\omega$G), and a calculated value obtained by subtracting the calculated rotation speed from the rotation speed detection value ($\omega$G) is controlled using a feedback element, the control stability is maintained with deterioration of the anti-disturbance property being prevented.

Note that the operating point calculation unit 11 corresponds to the "command value calculation means" according to one or more embodiments of the present invention. The rotation speed control unit 12 corresponds to the "generator torque command value calculation means". The rotation angle sensor 3 corresponds to the "rotation speed calculating unit". The subtractor 134 corresponds to the "first subtracting means". Finally, the control model 131 corresponds to the "control model estimation means", respectively.

Second Embodiment

Figure 4:
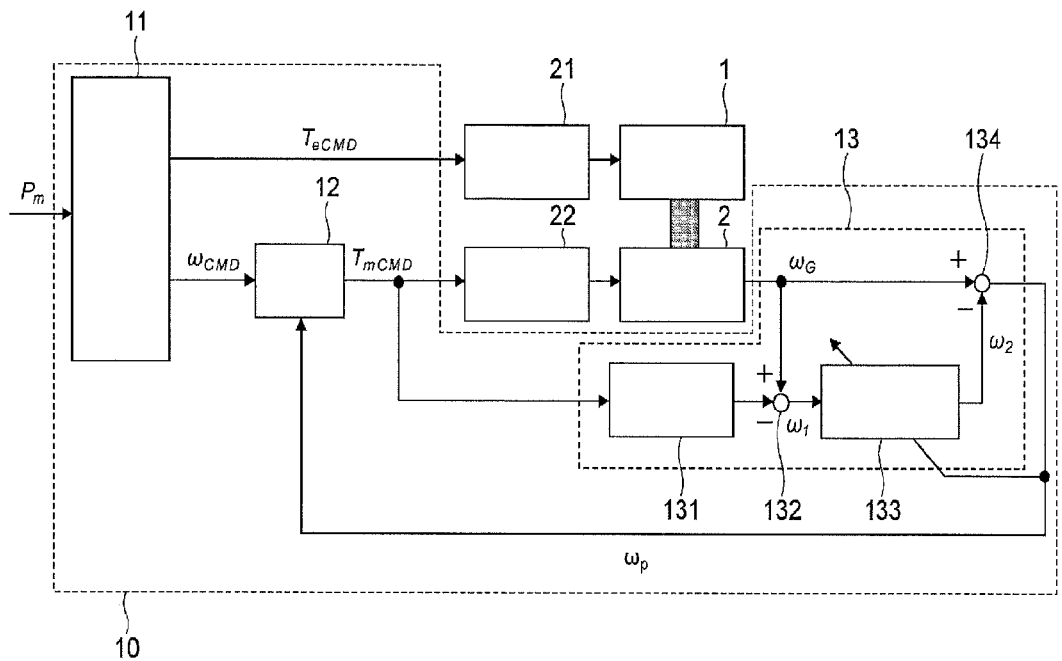
FIG. 4 is a block diagram showing the engine, the generator, the engine controller, the generator controller, and the power generation control unit included in the torque control device according to one or more embodiments of the present invention.

FIG. 4 relates to a second embodiment of the present invention, and shows, out of the torque control device, a block diagram illustrating the engine 1, the generator 2, the engine controller 21, the generator controller 22, and the power generation control unit 10. Compared to the first embodiment described above, the difference resides in that the natural frequency of the band pass filter 133 ($\omega$n) is set based on the rotation speed detection value ($\omega$G) or the rotation speed command value ($\omega$CMD). The configurations other than these are the same as those in the first embodiment, the description thereof will be incorporated.

As shown in FIG. 4, the band pass filter 133 receives the rotation speed detection value ($\omega$G) and the natural frequency ($\omega$n) corresponding to the pass frequency of the band pass filter 133 is set based on the rotation speed detection value ($\omega$G). The natural frequency ($\omega$n) may be expressed using the rotation speed detection value ($\omega$G) by the following equation for a four-cylinder engine 1. Note that the unit of wn is rad/s, and the unit for $\omega$G and $\omega$CMD is 1/min, respectively.

[Equation 6]

$$\omega_n = 2 \cdot 2\pi \cdot \omega_G / 60 \tag{6}$$

The Intermittent combustion frequency of the engine 1 is changed by the rotation speed of the engine 1, and the rotation speed of the engine 1 corresponds to the rotation speed of the generator 2. Further, in the second embodiment, since by using the rotational speed of the generator 2, the pass frequency of the band pass filter 133 is adjusted, even when the intermittent firing frequency of the engine 1 is changed in response to the rotation speed of the engine 1 being changed, the intermittent combustion frequency of the engine 1 can be included in the pass frequency band width of the band-pass filter 133.

As described above, in the second embodiment, the pass frequency of the band-pass filter 133 is set based on the rotation speed detection value ($\omega$G). The intermittent combustion frequency of the engine 1 varies in response to the rotation speed of the engine 1. Since, in the second embodiment, depending on the rotation speed (corresponding to the rotation speed detection value ($\omega$G)), the pass frequency of the band-pass filter 133 is adjusted, the torque pulsation of the generator 2 may be suppressed even at the engine rotation speed being changed so that the fluctuation in the generated power may be inhibited.

Note that, in the second embodiment, although the pass frequency of the band pass filter 133 is set on the basis of the rotation speed detection value (ωG), this may also be set based on rotation speed command value (ωCMD). That is, in the equation (6), the rotation speed command value (ωCMD) is used in place of the rotation speed detection value (ωG), natural frequency (ωn) may be calculated.

Third Embodiment

Figure 5:
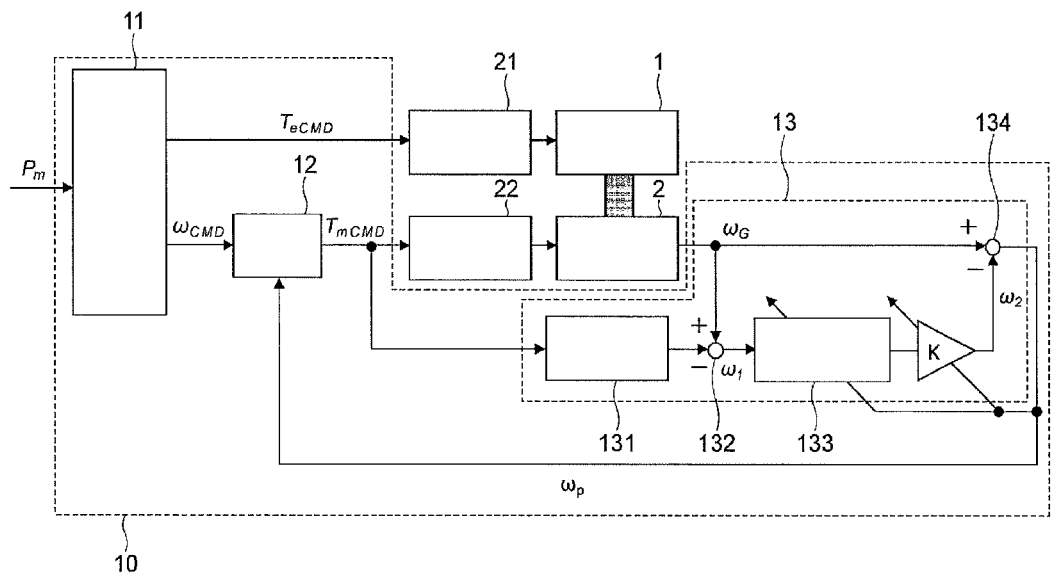
FIG. 5 is a block diagram showing the engine, the generator, the engine controller, the generator controller, and the power generation control unit included in the torque control device according to one or more embodiments of the present invention.
Figure 6:
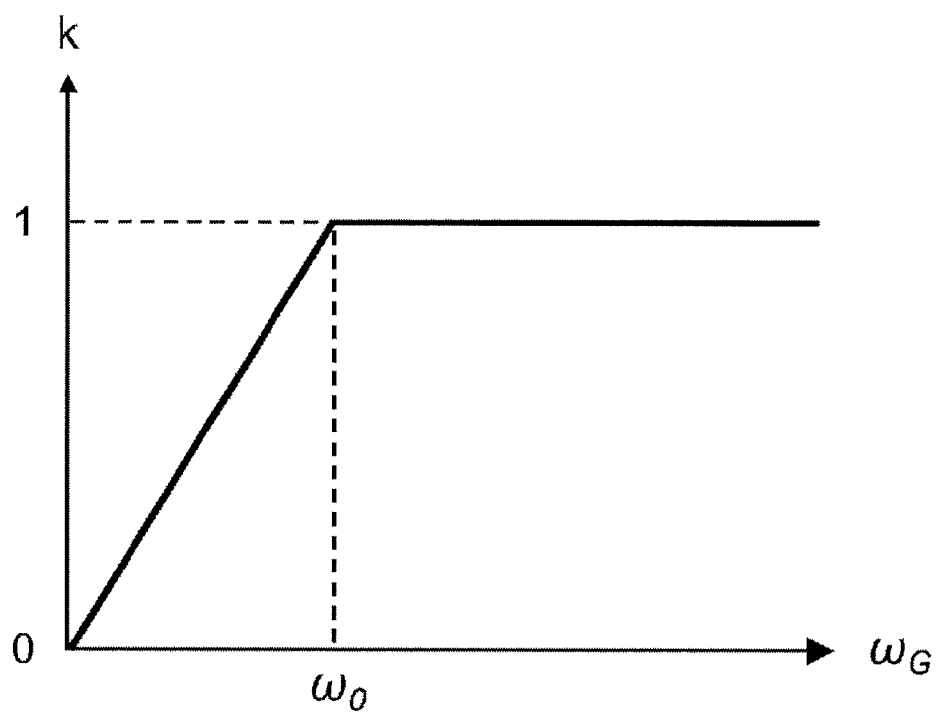
FIG. 6 is a graph showing the gain characteristics of the gain adjustment unit.

FIG. 5 relates to a third embodiment of the present invention, and shows, out of the torque control device, a block diagram illustrating the engine 1, the generator 2, the engine controller 21, the generator controller 22, and the power generation control unit 10. FIG. 6 is a graph showing the gain characteristics of the gain adjustment unit 135 with respect to the rotation speed detection value (ωG). In the third embodiment, the difference over the second embodiment resides in that the pulsation suppression filter 13 is provided with a gain adjustment unit 135. The configurations other than these are the same as those in the second embodiment, the description thereof will be incorporated by reference.

As shown in FIG. 5, the pulsation elimination filter 13 is provided with the control object model (Gp) 131, subtractors 132, 134, a band pass filter 133, and a gain adjusting unit 135. The gain adjusting unit 135 is disposed between the band pass filter 133 and the subtractor 134 and adjusts the gain of the rotation speed (ω2) output from the band pass filter 133 to output the rotation speed (ω2) to the subtractor 134.

A threshold frequency for adjusting the gain according to the frequency of the rotation speed (ω0) is set with the gain adjusting unit 135. As shown in FIG. 6, gain (k).is proportional to the rotation speed detection value (ωG) in a range between zero and ω0, while the rotation speed detection value (ωG) exceeds ω0, the gain (k) is set to "1". In other words, the gain adjustment is performed by setting the gain lower than 1 when the rotation speed detection value (ωG) is less than ω0, and the gain adjustment is not performed but the gain is set to "1" when the rotation speed detection value (ωG) exceeds ω0.

The rotation speed calculation value (ωp) output from the subtractor 134 may be represented by the following equation (7).

[Equation 7]

$$\omega_{FB} = \omega_G - k(\omega_G) \cdot \omega_2 \tag{7}$$

When the generator 2 is driven with the engine 1 being stopped to increases the rotation speed of the engine 1, the rotation speed of the engine 1 is positioned in a low speed range so that the rotation speed detection value (ωG) will be smaller than ω0. Because, in such a low rotation speed range, the gain (k) is set lower than "1", the proportion of the rotational pulsation removed from the rotation speed detection value (ωG) will be reduced. Thus, in the third embodiment, the pulsation in the low rotation speed range will be suppressed by the torque of the generator 2.

As described above, the pulsation removal filter 13 is provided with a gain adjusting unit 135 to multiply the output value of the band pass filter 133 a gain that is set in accordance with the rotation speed of the generator 2. Thus, even in the case in which the engine 1 has a resonance point at a low speed range, it is possible to prevent vibration and noise at the resonance point while suppressing the pulsation of the rotation speed. As a result, it is possible to suppress the fluctuation of the generated power of the generator 2.

Note that, although the gain adjusting unit 135 is provided on the output side of the band pass filter 133 in third embodiment, the gain adjusting unit 135 may be disposed to the input side of the band pass filter 133 to perform a gain adjustment with respect to the rotation speed (ω1) as in the same manner as those described above.

Fourth Embodiment

Figure 7:
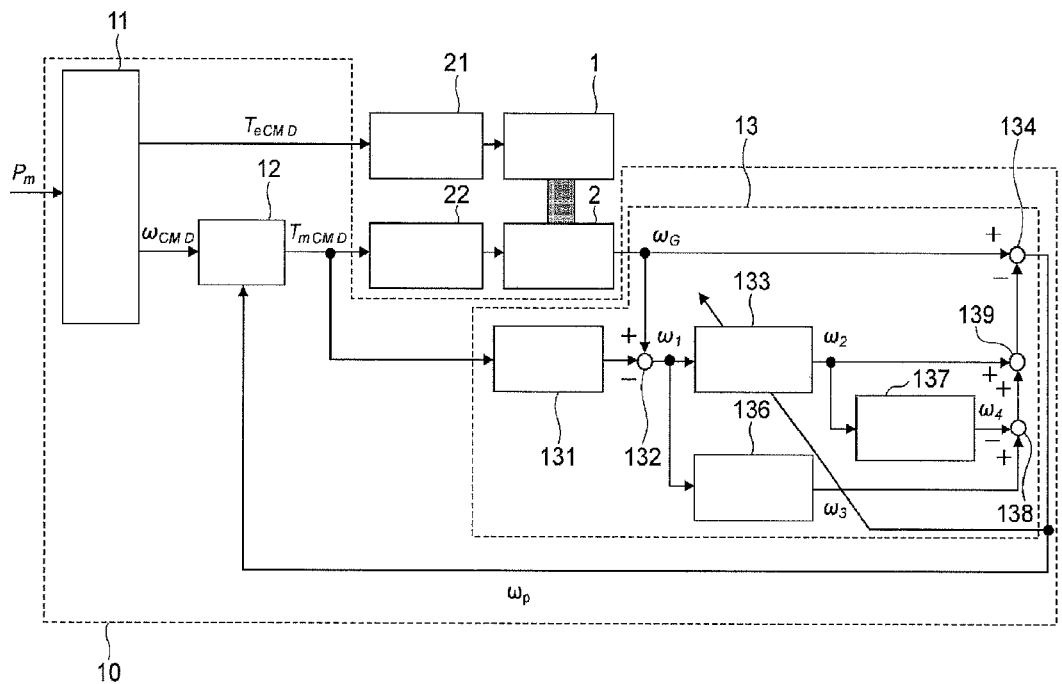
FIG. 7 is a block diagram showing the engine, the generator, the engine controller, the generator controller, and the power generation control unit included in the torque control device according to one or more embodiments of the present invention.

FIG. 7 relates to a fourth embodiment of the present invention, and shows, out of the torque control device, a block diagram illustrating the engine 1, the generator 2, the engine controller 21, the generator controller 22, and the power generation control unit 10. In the fourth embodiment, the difference over the second embodiment described above resides in that the pulsation suppression filter 13 is provided with high pass filters 136, 137. The configurations other than these are the same as those in the second embodiment, the description thereof will be incorporated by reference.

As shown in FIG. 7, the pulsation elimination filter 13 is provided with the control object model (Gp) 131, subtractors 132, 134, a band pass filter 133, and high pass filters 136, 137, a subtractor 138, and an adder 139. The high pass filter 136 receives the rotation speed (ω1) output from the subtractor 132 and causes a filter with a filtering characteristics described below to pass to output the rotation speed (ω2) to the subtractor 134. The band pass filter 133 outputs the calculated rotation speed (ω2) to both the high pass filter 133 and the adder 139. The high pass filter 137 receives the rotation speed (ω2) output from the band pass filter 133 and causes to pass a filter with a filtering characteristics described below to output the rotation speed (ω4) to the subtractor 138. The subtractor 138 in turn subtracts the rotation speed (ω4) from the rotation speed (ω3) to output to the adder 139. The adder 139 adds the calculation value calculated by the subtractor 138 and the rotation speed value (ω2) to output to the subtractor 134.

The transfer characteristics of the high pass filter 136 and 137 (GHPF) may be represented by the following equation (8).

[Equation 8]

$$G_{HPF}(s) = \frac{s}{s + \omega_H} \tag{8}$$

wherein ωH is the cutoff frequency of the high-pass filter 136 and 137 and is set to a frequency higher than the frequency of the intermittent combustion of the engine 1. For a four-cylinder engine, ωH is represented by the following equation (9).

[Equation 9]

$$\omega_H = \alpha \cdot 2\pi \cdot \omega_G / 60, (\alpha > 2) \tag{9}$$

However, in the case in which the control frequency band is positioned within a frequency band between zero and ωGN, the lower limit of the cutoff frequency (ωH) is set to ωGN. Accordingly, the cutoff frequency of the high pass filters 136, 137 will be higher than the frequency of the intermittent combustion engine 1 and higher or equal to the upper limit frequency of the control frequency band of the generator 2.

The high-pass filter 136 is a filter configured to the pulsation or ripple component in the rotation speed caused by the torque pulsation attributable to a reciprocating movements of both the piston and crank mechanism of the engine 1. The rotation speed (ω3) corresponding to the ripple component is calculated by the following equation (10).

[Equation 10]

$$\omega_3 = G_{HPF} \cdot \omega_1 \quad (10)$$

The high pass filter 137 is a filter configured to filter the ripple or pulsation component of the rotation speed caused by the engine torque pulsation attributable to the intermittent combustion of the engine 1. The rotation speed (ω4) corresponding to the ripple component is calculated by the following equation (11).

[Equation 11]

$$\omega_3 = G_{HPF} \cdot \omega_1 \quad (10)$$

The rotation speed calculation value (ωp) output from the subtractor 134 is calculated by subtracting the calculated value of the adder 139 from the rotation speed detection value (ωG) in accordance with the following equation (12).

[Equation 12]

$$\omega_p = \omega_G - \omega_2 - \omega_3 + \omega_4 \quad (12)$$

Accordingly, the rotation speed calculation value (ωp) that is feedbacked to the rotation speed control unit 12 will be such a value that removes from the rotation speed detection value (ωG) the pulsation component of the rotation speed due to the intermittent combustion of the engine 1 and both the pulsation component and the high frequency noise due to the reciprocating movements of the piston and crank mechanism of the engine 1.

As described above, a high pass filter 136 that calculates the rotation speed (ω3) from the estimated value of the control object model 131 and the rotation speed detection value (ωG), a high pass filter 137 that calculates the rotation speed value (ω4) from the rotation speed (ω2), a subtractor 138 that produces a difference between the rotation speed (ω3) and the rotation speed (ω4), and an adder 139 that adds the calculated value of the subtractor 138 and the rotation speed (ω2) are provided. Accordingly, in the fourth embodiment, since the feedback control is performed after removing from the rotation speed detection value (ωG) the ripple or pulsation component due to the intermittent combustion of the engine 1 and removing both the pulsation component and a high frequency noise component due to reciprocating movements of a piston and crank mechanism of the engine 1, the torque pulsation of the generator 2 may be suppressed to inhibit the fluctuation of the generated power.

Further, in the fourth embodiment, the cutoff frequency of the high pass filters 136, 137 is set higher than the intermittent combustion frequency of the engine 1 and higher than the upper limit frequency of the control frequency band of the generator 2. If the cutoff frequency of the high pass filter 136, 137 would be set within a frequency of the control frequency band of the generator 2, the torque responsiveness of the generator 2 might be worsened and the anti-disturbance property might be deteriorated. In the fourth embodiment, since the lower limit frequency of the cutoff frequency of the high pass filters 136, 137 is set higher than the upper limit frequency of the control frequency band, the torque response of the generator 2 is improved, and the rotation speed pulsation may be prevented while inhibiting the deterioration of the anti-disturbance.

The high pass filter 136 corresponds to the "first high pass filter" according to one or more embodiments of the present invention, the rotation speed (ω3) corresponds to the "first high frequency rotation speed pulsation value" according to one or more embodiments of the present invention, the high pass filter 137 corresponds to the "second high pass filter" according to one or more embodiments of the present invention, the rotation speed (ω4) corresponds to the "second high frequency rotation speed pulsation value", the subtractor 138 corresponds to the "second subtraction means", and the adder 139 corresponds to the "adding or summing means".

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

1 . . . engine
2 . . . generator
3 . . . rotation angle sensor
4 . . . generator inverter
5 . . . battery
6 . . . drive inverter
7 . . . driving motor
8 . . . reduction gear or device
9 . . . driving wheel
21 . . . engine controller
22 . . . generator controller
23 . . . battery controller
24 . . . driving motor controller
100 . . . system controller
10 . . . power generation control unit
11 . . . operating point calculation unit
12 . . . rotation speed control unit
13 . . . pulsation removal filter
131 . . . control object model
132, 134, 138 . . . subtractor
133 . . . band-pass filter
135 . . . gain adjusting unit
136, 137 . . . high-pass filter
139 . . . adder

The invention claimed is:

1. A torque control device for use in a hybrid vehicle equipped with a generator driven by an internal combustion engine, comprising:

a command value calculator that calculates an engine torque command value and a rotation speed command value of the generator based on a target generation power of the generator set in accordance with a running state of the hybrid vehicle;

a generator torque command value calculator that calculates a generator torque command value to cause a rotation speed calculation value to match the rotation speed command value;

a generator controller that controls the generator based on the generator torque command value;

a rotation speed detector that detects a rotation speed detection value of the generator; and a pulsation removal filter that removes a pulsation component of the rotation speed due to the pulsation of the engine from the rotation speed detection value detected by the rotation speed detector to calculate the rotation speed calculation value, wherein the pulsation removal filter comprises:

a control object model estimator that estimates an estimated value of a control object model that models a control object;

a band pass filter that calculates a rotation speed pulsation value based on a difference between the estimated value estimated by the control object model estimator and the rotation speed detection value;

a first subtractor unit that calculates the rotation speed calculation value based on the difference between the rotation speed detection value and the rotation value pulsation value, wherein a pass frequency of the band pass filter matches an intermittent combustion frequency of the band pass filter;

a first high pass filter that calculates a first high frequency rotation speed pulsation value based on a difference between the estimated value and the rotation speed detection value;

a second high pass filter that calculates a second high frequency rotation speed detection value based on the rotation speed pulsation value;

a second subtracting unit that produces a difference between the first high frequency rotation speed pulsation value and the second high frequency rotation speed value; and an adding unit that adds the calculated value by the second subtracting unit to the rotation speed pulsation value, wherein the first subtracting unit calculates the rotation speed calculation value based on a value calculated by the adding unit.

2. The torque control device as claimed in claim 1, wherein the pass frequency is set based on the rotation speed detection value.

3. The torque control device as claimed in claim 1, wherein the pulsation removal filter includes a gain adjusting unit to multiply either the input value or output value of the band pass filter a gain that is set based on the rotation speed of the generator, and wherein the first subtractor unit calculates the rotation speed calculation value based on the output of the gain adjusting unit.

4. The torque control device as claimed in claim 1, wherein both a cutoff frequency of the first high pass filter and that of the second high frequency high pass filter is set higher than the intermittent combustion frequency of the engine and higher than or equal to the upper limit frequency of the control frequency band of the generator.

* * * * *